(12) United States Patent
Takeda

(10) Patent No.: US 7,807,338 B2
(45) Date of Patent: Oct. 5, 2010

(54) METHOD OF MANUFACTURING MAGNETIC DISK

(75) Inventor: Minoru Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 11/548,920

(22) Filed: Oct. 12, 2006

(65) Prior Publication Data

US 2008/0019047 A1   Jan. 24, 2008

(30) Foreign Application Priority Data

Oct. 19, 2005   (JP)   ............................. 2005-304679

(51) Int. Cl.
*G11B 5/82* (2006.01)
(52) U.S. Cl. ...................... 430/320; 430/323
(58) Field of Classification Search ........................ None
See application file for complete search history.

(56) References Cited

U.S. PATENT DOCUMENTS

2006/0115584 A1 * 6/2006 Hattori et al. ............... 427/127

FOREIGN PATENT DOCUMENTS

| JP | 05-242470 | | 9/1993 |
| JP | 6-124437 A | * | 5/1994 |
| JP | 8-077539 A | * | 3/1996 |
| JP | 09-097482 | | 4/1997 |
| JP | 2000-299276 | | 10/2000 |
| WO | WO 2005/015549 A1 | * | 2/2005 |

OTHER PUBLICATIONS

Computer-generated translation of JP 6-124437 (May 1994).*
Computer-generated translation of JP 8-077539 (Mar. 1996).*
IEEE Transactions on Magnetics, vol. 41, No. 2, Feb. 2005, pp. 670-675.
IEEE Transactions on Magnetics, vol. 40, No. 4, Jul. 2004, pp. 2510-2515.
Japanese Office Action for corresponding JP 2005-304679 issued on Jan. 12, 2010.

* cited by examiner

*Primary Examiner*—John A. McPherson
(74) *Attorney, Agent, or Firm*—K&L Gates LLP

(57) ABSTRACT

A method of manufacturing a magnetic disk is provided. The method of manufacturing a magnetic disk includes the step of disposing a plurality of magnetic recording tracks concentrically, each of the magnetic recording track including a data information recording area and a control information recording area, and the step of forming a separation groove between data areas each included in the data information recording area, and in which data is written, wherein, the step of forming a separation groove includes the step of forming a resist layer having an opening corresponding to a pattern of the separation groove by photolithography, and the step of etching to form the separation groove on a surface of a substrate or a material formed on the substrate through the opening of the resist layer, the step of forming the resist layer and the step of etching are performed for both of a front surface and a back surface of the substrate.

4 Claims, 10 Drawing Sheets

METHOD OF MANUFACTURING MAGNETIC DISK

CROSS REFERENCES TO RELATED APPLICATIONS

The present application claims priority to Japanese Patent Application JP 2005-304679 filed in the Japan Patent Office on Oct. 19, 2005, the entire contents of which is being incorporated herein by reference.

BACKGROUND

The present application relates to a method of manufacturing a magnetic disk.

In order to realize a large capacity magnetic storage device, it is required to achieve further high-density. In hard disk drives, which are typical magnetic storage devices, those with surface recording density of higher than several tens gigabit per square inch have already been commercialized.

FIG. 10 is a schematic cross-sectional view of a typical hard disk medium. This hard disk medium is composed by sequentially providing a magnetic layer 2, a protective layer 3, and a lubricant layer 4 on a flat surface of a substrate 1 formed of a Al substrate provided with a Ni layer on the surface thereof. Annular recording tracks are disposed in a flat and continuous magnetic layer concentric around the central axis illustrated with a chain line c of the center hole 5. The recording tracks are not physically isolated from the adjacent ones and formed as a continuous area.

Therefore, in such a hard disk medium, the density in the radial direction, namely the track pitch, affects the S/N ratio of a reproduction signal.

In such a case in which the configuration having the adjacent recording tracks in the continuous area is adopted, the track width (hereinafter simply referred to as a magnetic recording head width) $Ww$ of a magnetic gap of the magnetic recording head needs to be selected to be narrower than the recording track width $W$ ($Ww<W$) considering the effect to the S/N ratio of the reproduction signal.

That is, the width of a recording mark recorded by the magnetic recording head becomes, in practice, wider than the magnetic recording head width $Ww$ because of the blurring phenomenon caused by the leakage magnetic field in the radial direction of the hard disk medium derived from the magnetic gap of the magnetic recording head. Therefore, the width of the recording mark is composed of a part (with substantially the same width as the magnetic recording head width) formed by the magnetic recording head and a part formed by the blurring phenomenon, and it can be said that a correct reproduction signal cannot be obtained from the part of the recording mark formed by the blurring phenomenon.

Therefore, if the magnetic recording head width $Ww$ is set to be substantially the same as the recording track width $W$, the magnetic recording head writes a superfluous signal in the adjacent recording track, which causes corrosion of the recording mark formed on the adjacent track.

Then, if such corrosion of the recording mark occurs, the S/N ratio of the reproduction signal is degraded when the reproduction head performs detection of the leakage magnetic field, namely reproduction of the recorded information data of this recording mark.

Therefore, the magnetic recording head width $Ww$ needs to be selected to be narrower than the recording track width $W$ ($Ww<W$) as described above.

Meanwhile, in order to obtain high-sensitive reproduction signal from the leakage magnetic field of the recording mark, it is necessary to avoid detecting the leakage magnetic field from the part formed by the blurring phenomenon in the recording process as described above. Accordingly, the width $Wr$ of the reproduction head needs to be equal to or even narrower than the width of the recording mark. In particular, since the center of the recording track cannot always be traced because of the servo error in the reproduction operation, the reproduction head width $Wr$ needs to be selected taking the error into consideration.

However, since an only small reproduction signal, which causes the S/N ratio to decrease, is obtained with the narrow reproduction head width $Wr$, it is preferable to make the width $Wr$ as large as possible.

In consideration of the above, the relationship between the reproduction head width $Wr$, the magnetic recording head width $Ww$ and the recording track width $W$ will be selected as follows.

$Wr<Ww<W$

In other words, it is difficult to form the recording mark using the whole of the recording track width $W$, and on the other hand, it is difficult to use the whole width of the recording mark thus formed as the object of reproduction.

Therefore, a method called discrete track recording (DTR) is presently proposed as the density growth technology for hard disk drives (see, for example, IEEE Transaction on Magnetics, Vol. 40, No. 4, Jul. 2004, pp. 2510-2515, hereinafter referred to as a first document).

According to the DTR, the problem regarding the recording track pitch described above can be alleviated. Specifically, it is a hard disk medium provided with a physical separation groove between the adjacent recording tracks to separate the adjacent recording tracks from each other, the groove being formed so that the leakage magnetic field from the inside of the groove does not reach the reproduction head, namely so as to have a groove depth and a groove shape enough for preventing the reproduction head from detecting the leakage magnetic field.

According to the DTR, since consideration of the blurring phenomenon is not necessary in the hard disk medium provided with the separation groove formed between the adjacent recording tracks, the magnetic recording head width $Ww$ can be made larger than the width of a land defined between the grooves of the recording track, and accordingly, the recording mark can be formed to have the width identical to the whole width of the land between the separation grooves.

Further, at the same time, since the consideration of the blurring phenomenon is not necessary, the magnetic reproduction head width $Wr$ can be made larger than the whole width of the land between the separation grooves, namely the land width. Accordingly, the whole width of the land can absolutely be used for reproduction even with the servo error.

In other words, in the DTR configuration, since the width of the recording mark is determined by the land width, and the recording mark can be formed to have large width, the S/N ratio to the track pitch can be increased.

Incidentally, in a past process of manufacturing the magnetic disk substrate with such a DTR structure, namely the concavo-convex separation groove, the magnetic disk is formed by etching the magnetic film provided on the magnetic disk substrate applying a lithography process using an electron beam or a lithography process of a nanoimprint method to separate the magnetic film with the separation groove, and further filling the separation groove with a planarizing layer made of a silicon oxide film as described in the first document (see TMRC 2004 Paper F5 Submitted for Publication in IEEE Transaction on Magnetics, pp. 1-6).

However, there has been a problem of remarkably lowering the productivity in manufacturing the magnetic disk substrate by processing every magnetic disk substrate with the electron beam lithography process or the nanoimprint process.

SUMMARY

It is therefore desirable to provide a method of manufacturing a magnetic disk capable of manufacturing the magnetic disk with the DTR structure easily with high productivity.

According to an embodiment, there is provided a method of manufacturing a magnetic disk, including the step of disposing a plurality of magnetic recording tracks concentrically, each of the magnetic recording track including a plurality of sectors, the sector including a data information recording area and a control information recording area, and the step of forming a separation groove between data areas each included in the data information recording area included in each of the plurality of magnetic recording tracks, and in which data is written, wherein, the step of forming a separation groove includes the step of forming a resist layer having an opening corresponding to a pattern of the separation groove by photolithography, and the step of etching to form the separation groove with a predetermined depth on a surface of a substrate or a material formed on the substrate through the opening of the resist layer, in the step of forming the separation groove, the step of forming the resist layer and the step of etching are performed for both of a front surface and a back surface of the substrate.

Further, in the above method of manufacturing a magnetic disk, exposure in the photolithography in the step of forming the separation groove can be reduced projection exposure using an exposure mask board formed by lithography using pattern exposure with an electron beam or a laser beam.

As described above, the method of manufacturing a magnetic disk according to an embodiment is the method of manufacturing a magnetic disk of the DTR configuration in which the data areas in the data information recording areas to which data is written are separated with the separation groove. In particular, since the photolithography process and the etching process are performed for both of the front and the back surfaces of the substrate in the separation groove forming process, the magnetic disk with the DTR configuration can be manufactured with the storage capacity doubled in comparison with the single sided magnetic disk, in other words, the magnetic disk worth two of the past magnetic disks can easily be manufactured in large quantities, so to speak.

Further, in the method of manufacturing a magnetic disk according to an embodiment, since a number of magnetic disks can be formed on the single wafer substrate by performing the reduced projection exposure using the exposure mask board in the photolithography of the separation groove forming process, a number of magnetic disks can be manufactured at the same time by performing a series of processes, namely the photolithography process, the etching process, the film forming process, thus the mass productivity can further be enhanced.

As described above, according to a method of manufacturing a magnetic disk of an embodiment, the magnetic disk can easily be manufactured with an enhanced productivity by forming the separation grooves on both sides of the magnetic disk.

Still further, in the method of manufacturing the magnetic disk according to the embodiment, by performing reduced projection exposure using the exposure mask board in the photolithography of the separation groove forming process, a number of magnetic disks can be manufactured at the same time, thus enhancing mass productivity.

Additional features and advantages are described herein, and will be apparent from, the following Detailed Description and the figures.

DETAILED DESCRIPTION

A description is provided below in further detail with reference to the drawings.

Embodiment of Magnetic Disk

Figure 1:
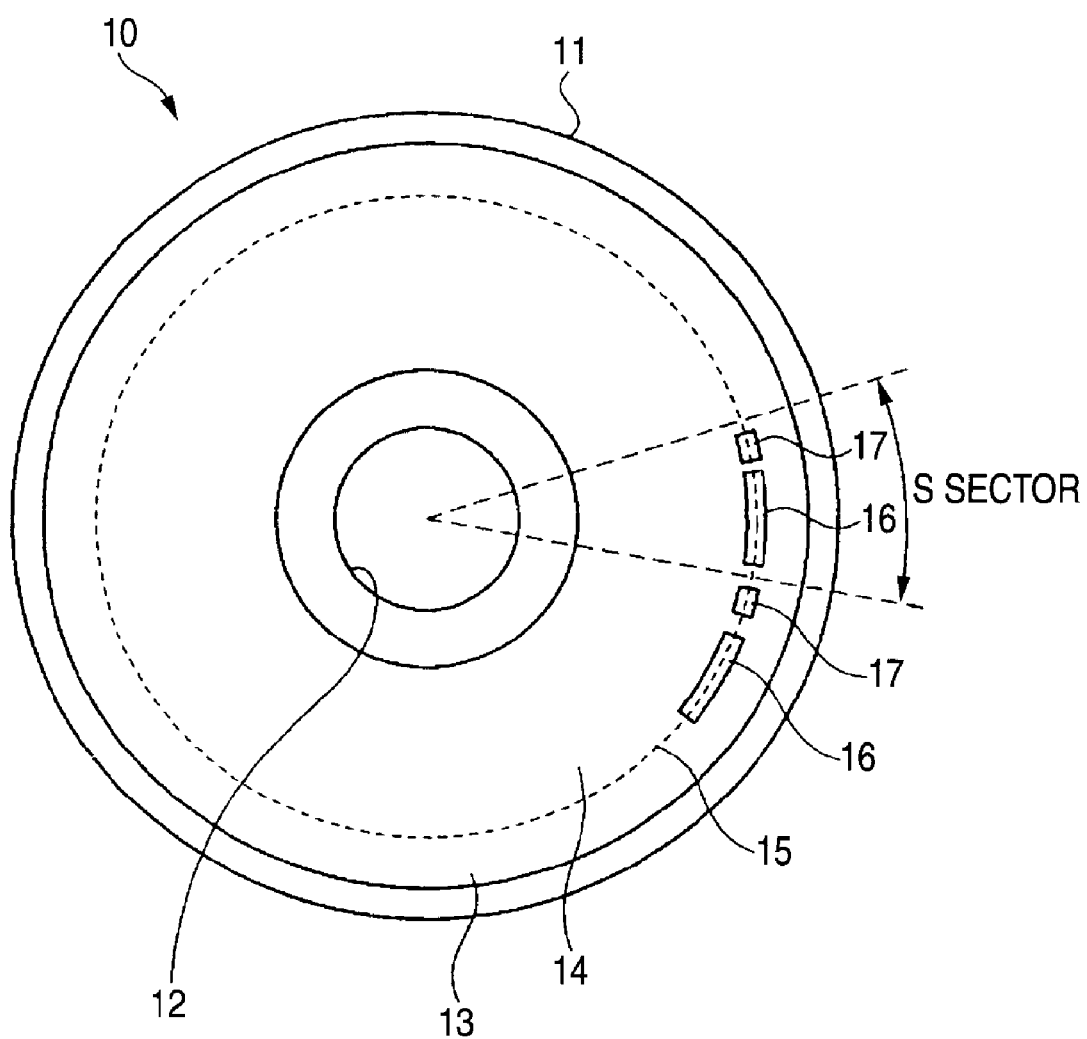
FIG. 1 is a schematic planar configuration diagram of an example of a magnetic disk applicable to a method of manufacturing a magnetic disk according to an embodiment.

FIG. 1 is a schematic planar configuration diagram of a hard disk medium as an example of a magnetic disk preferably applicable to a method of manufacturing a magnetic disk according to an embodiment. A magnetic disk 10 is composed of a disk-shaped disk substrate 11 made of Al, glass, Si, or the like provided with a center hole 12 with which the magnetic disk is implemented to a magnetic disk drive (not shown), and a magnetic layer 13 formed on the disk substrate 11 around the center hole 12 which forms a magnetic recording area 14.

The magnetic recording area 14 is provided with a number of magnetic recording tracks 15 (only one of the tracks is shown in FIG. 1) formed around the center hole 12 disposed in a concentric manner. In each of the magnetic recording track 15, there are disposed a number of sectors S composed of a data information recording area 16 and a control information recording area 17 forming a configuration in which the data information recording area 16 is sectionalized by the control information recording area 17.

Figure 2:
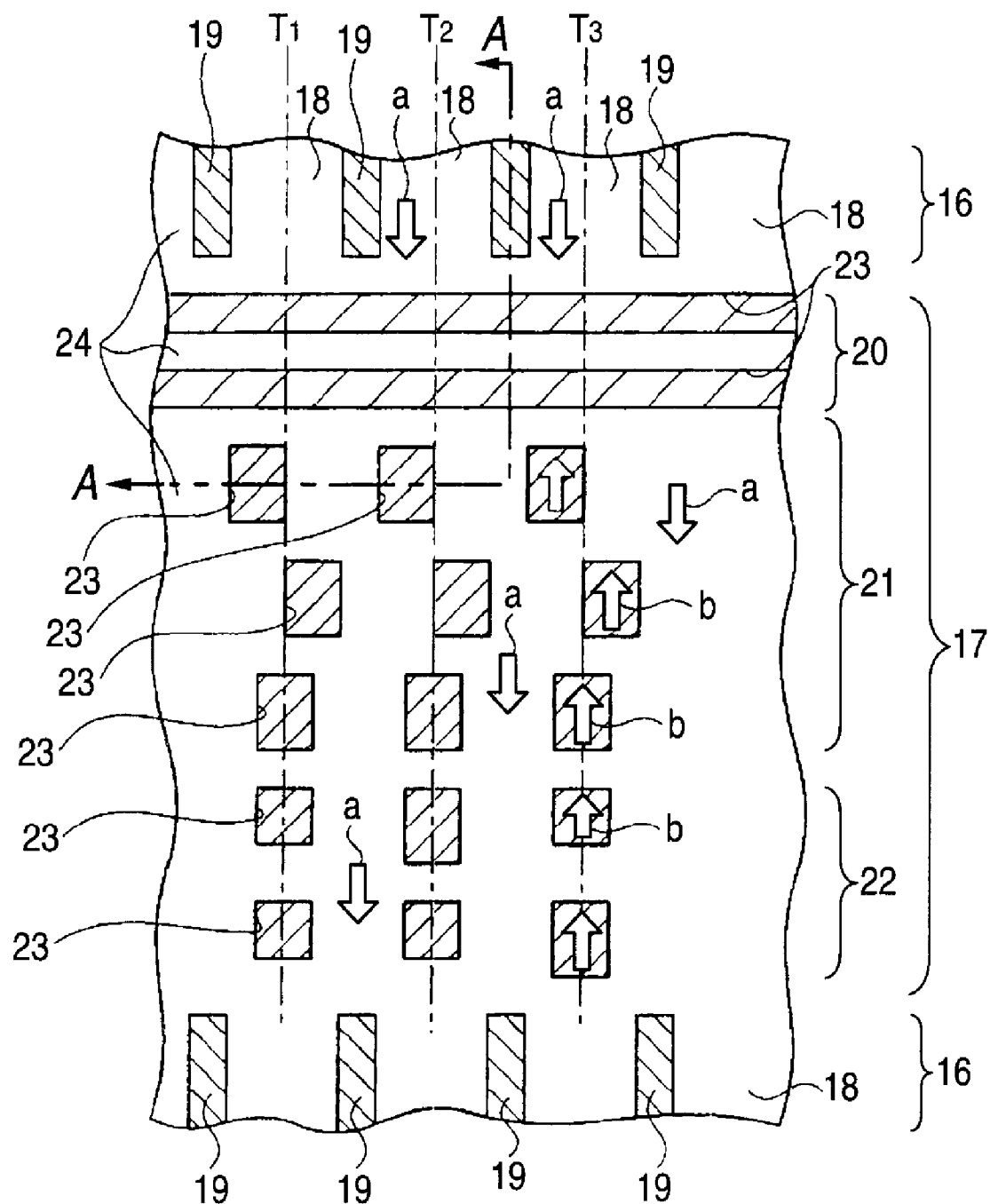
FIG. 2 is a schematic pattern diagram of a substantial part of an example of a magnetic disk applicable to the method of manufacturing a magnetic disk according to an embodiment.
Figure 3:
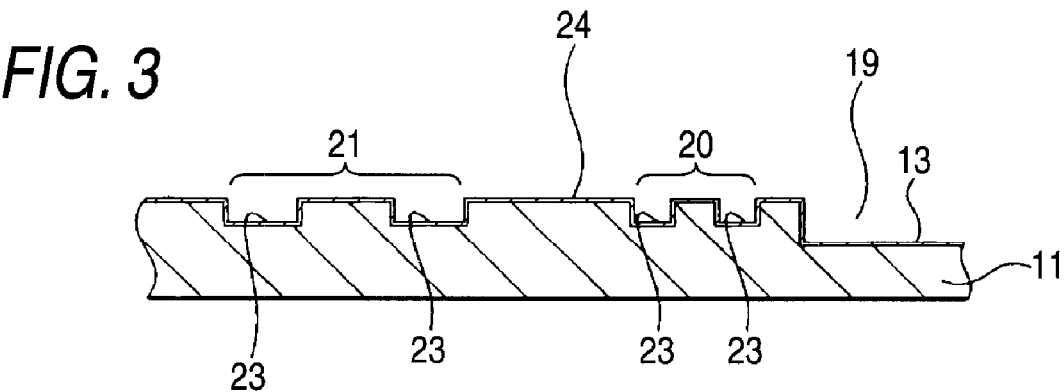
FIG. 3 is a schematic cross-sectional view along the A-A line in FIG. 2.

FIG. 2 is a schematic plan view of a substantial part of the magnetic disk 10 shown in FIG. 1 wherein the chain lines T1, T2, T3, . . . denote the center lines of some of the magnetic tracks 15 concentrically adjacent to each other. Further, FIG. 3 is a schematic cross-sectional view along the A-A line in FIG. 2.

As shown in FIG. 2, between data areas 18, to which information data is written, in the data information recording areas 16 of the magnetic recording tracks 15 adjacent to each other, there is formed a separation groove 19 having a predetermined depth with respect to the upper surface of the data areas 18, and the data areas 18 are patterned like strips by the separation grooves 19.

The control information recording area 17 is provided with a clocking area 20 into which a clock signal for detecting a phase signal is written, a servo area 21 into which a servo signal for obtaining tracking servo control information while reproducing the information data is written, and an address area 22 into which address information or ID (identification) information is written.

The clocking area 20, the servo area 21, and the address area 22 in the control information recording area 17 respectively store the clock signal, the servo signal, and one of the address information and the ID information. Such control information signal can also be formed as concave pits 23 having a predetermined depth with respect to the surface of the data area 18, namely the upper surface of the land 24 as shown in FIGS. 2 and 3.

The magnetic layer 13 is formed at least inside the concave pits 23 and on the lands 24 except the concave pits 23 and the separation grooves 19, and record reproduction of each of the control information signals is performed by magnetizing the magnetic layer 13 so that the inside of the concave pits 23 and the land 24 are provided with reversed magnetization from each other, for example, and by detecting magnetic reversal at the edge of the concave pits 23.

That is, in the case in which one way longitudinal magnetization, for example, along the direction of the magnetic recording tracks is provided to the land as illustrated with an outline arrow a in FIG. 2, the control information is recorded by magnetization in the reversed direction illustrated with an outline arrow b.

The depth of the separation groove 19 of the data information recording area 16 is selected to be sufficiently larger than the depth of the concave pit 23 as shown in FIG. 3, to be able to prevent the data information on the land 24 separated by the separation groove 19 from interfering each other in writing and reading the data information.

As described above, in the magnetic recording area provided with the magnetic layer 13 shown in FIG. 1 formed thereon, each of a number of the recording tracks 15 formed concentrically is composed of a number of sectors S formed of the data information recording areas 16 intermittently disposed with the control information recording sections 17 as interrupting sections.

In the present configuration, the magnetic disk 10 is turned to run the reproduction magnetic head on the magnetic track 15. In this case, since the detected magnetic field is reversed at the edge positions of the concave pits 23, the readout of the clock signal, the servo signal, and the address signal can thus be performed.

Thus, the data information in the data information area 18 can be retrieved while tracking of the magnetic head to the magnetic track 15 is performed with a high degree of accuracy.

Further, in the method of manufacturing a magnetic disk according to the embodiment, the separation grooves described above are formed on both surfaces of the substrate. Firstly an example of forming the separation grooves 19 described above by a photolithography process and an etching process utilizing the reduced projection exposure method will be described.

In this case, a number of magnetic disks can simultaneously be obtained by providing a substrate with the large area allowing to manufacture a number of magnetic disks, a number of magnetic disks are simultaneously formed on the large area substrate, and then dividing it into a number of magnetic disks.

The exposure of each of these magnetic disks in the photolithography process is performed by a step exposure method in which the exposure mask board for forming the separation groove 19 is formed, and performing the reduced projection exposure for each of the magnetic disks using the exposure mask.

Further, the exposure mask board used for the reduced projection exposure process is manufactured, for example, as the exposure mask board having, for example, a fourfold or fivefold homothetic pattern to the magnetic disk substrate 11 of the targeted magnetic disk 10.

Figure 4A:
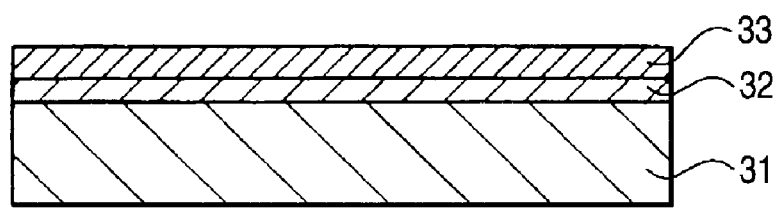
FIGS. 4A through 4C are process diagrams of an example of a method of manufacturing an exposure mask board used for a method of manufacturing a magnetic disk according to an embodiment.
Figure 4B:
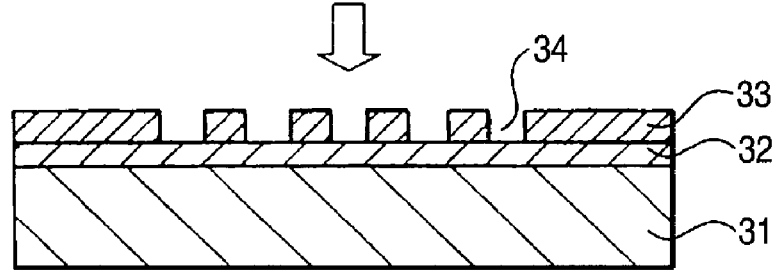
Figure 4C:
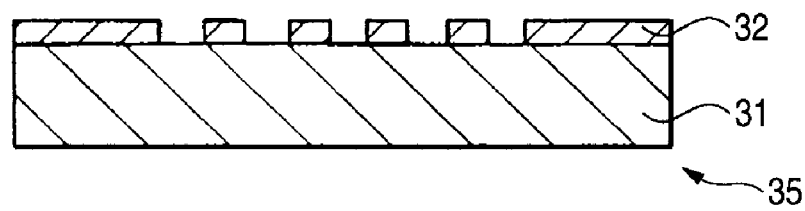

FIGS. 4A through 4C are process diagrams of an example of the method of manufacturing the exposure mask board. As shown in FIG. 4A, there is provided an exposure mask substrate 31 formed of a glass substrate, a quartz glass substrate, or the like, for composing the exposure mask board, and a light blocking metal film 32 made of Cr is applied on the surface thereof, and further, a resist layer 33 made of, for example, a positive type photoresist, in this example, is applied thereon.

By performing development process of the resist layer 33 after performing the pattern exposure on the resist layer 33, the exposed section is removed in the positive type of the photoresist layer to form openings 34 as shown in FIG. 4B.

By etching the light blocking metal film 32 through the openings 34 of the resist layer 33, the exposure mask board 35 provided with light blocking sections formed of the remaining part of the light blocking metal film 32 is manufactured as shown in FIG. 4C.

The pattern exposure to the resist layer 33 in the manufacturing process of the exposure mask board 35 can be performed by, for example, the laser beam scanning.

Figure 5:
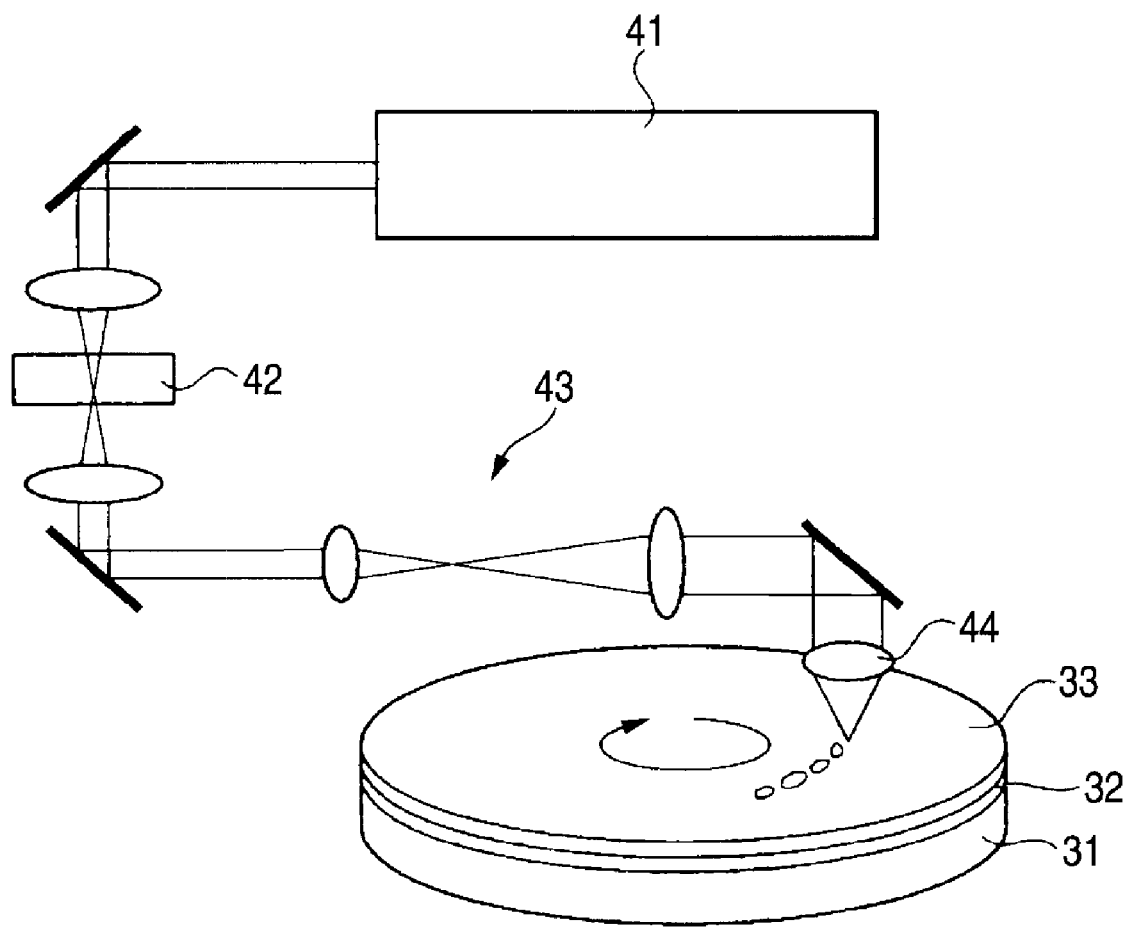
FIG. 5 is a schematic configuration diagram of an example of a laser beam exposure device for manufacturing an exposure mask board used for a method of manufacturing a magnetic disk according to an embodiment.

For the laser beam exposure, so-called a laser beam recorder (LBR) can be used. A schematic configuration diagram of an example of the laser beam recorder is shown in FIG. 5.

The LBR is provided with a laser source 41 for emitting an ultraviolet laser beam such as Ar laser with a wavelength of 351 nm or YAG fourth harmonic laser with a wavelength of 266 nm, an acoustooptical modulator 42, a beam expander 43, and a field lens 44 with a numerical aperture (N.A.) of about 0.9.

Meanwhile, the light blocking metal film 32 show in FIG. 4A and the exposure mask substrate 31 provided with the resist layer 33 formed on the light blocking metal film 32 are fixed on a air spindle (not shown) capable of rotating at high speed.

Then, in the condition in which the exposure mask substrate 31 rotates at high speed, the laser beam from the laser source 41 to the resist layer 33 on the exposure mask substrate 31 is turned on or off by the acoustooptical modulator 42 at high speed in accordance with the pattern of the targeted mask board, thus the laser beam expanded to be several millimeters in diameter by the beam expander 43 is collected onto the resist layer 33 by the field lens 44 to perform the exposure. By performing the exposure with a constant track pitch in a concentric manner while slowly sliding the exposure mask substrate 31 in a radial direction, the exposure can be performed with an expanded pattern for the arranged DTR disk.

After then, by dipping it in the exclusive developer of the resist layer 33, the exposed section is dissolved by the developer, in the case of positive type resist, thus the openings 34 of the expanded pattern of the separation grooves 19 can be formed as shown in FIG. 4B.

In this case, by using the laser source 41 with a wavelength of 266 nm, for example, the resolution of 400 nm in track pitch, with which the pattern of the separation groove 19 includes a sufficient margin, can be obtained.

Subsequently, using the resist layer 33 in which the openings 34 are thus formed as a mask, as described above, the light blocking metal film 32 made of Cr or the like is etched as shown in FIG. 4C, and after then, the resist layer 33 is removed. As described above, the exposure mask board 35 can thus be manufactured.

Further, the exposure to the resist layer 33 can also be performed by the electron beam exposure instead of the laser beam exposure described above.

Figure 6:
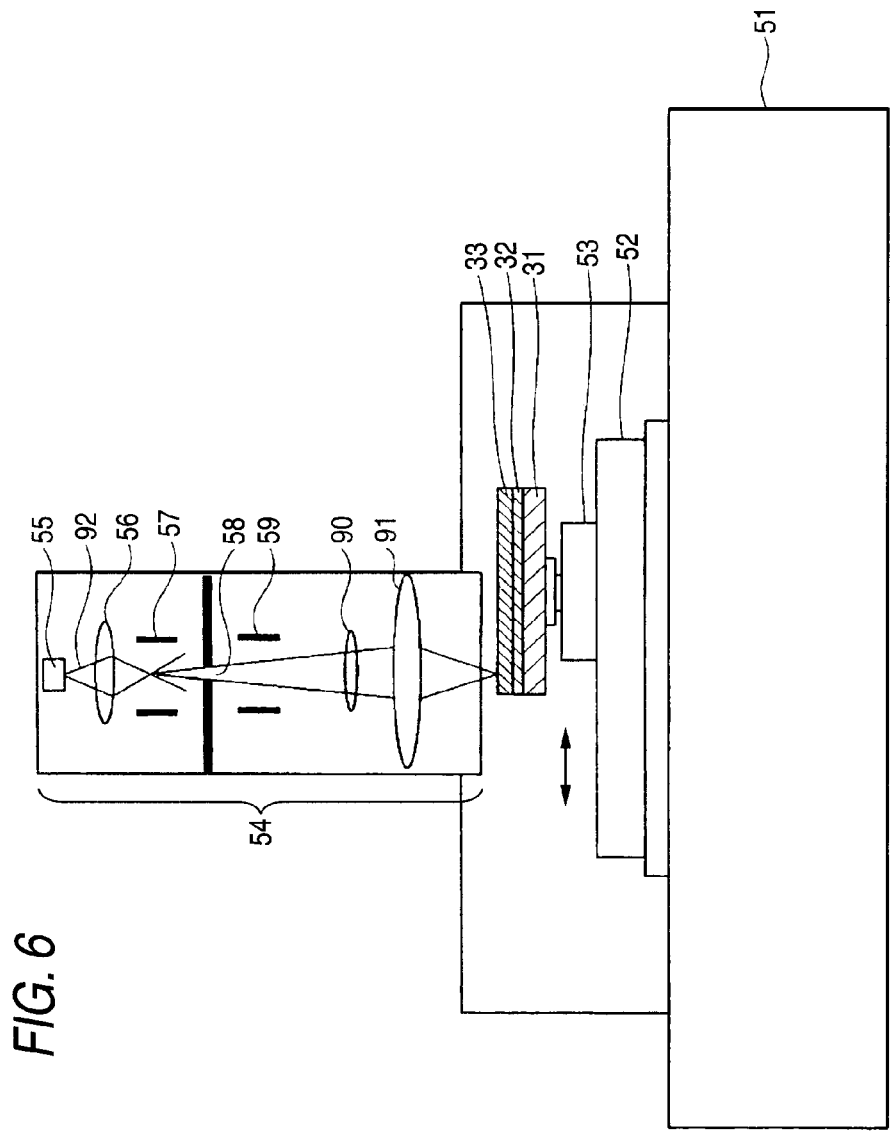
FIG. 6 is a schematic configuration diagram of an example of an electron beam exposure device for manufacturing an exposure mask board used for a method of manufacturing a magnetic disk according to an embodiment.

FIG. 6 is a schematic configuration diagram of the electron beam recorder (EBR) for performing the electron beam exposure.

In this case, the resist layer 33 on the light blocking metal film 32 on the exposure mask substrate 31 is composed of the electron beam resist.

The EBR includes a vibration-free table 51, on which a disposing section for the irradiated body of the electron beam, namely a disposing section for the exposure mask substrate 31 coated with the light blocking metal film 32 coated with the resist layer 33 is provided.

The disposing section for the exposure mask substrate 31 is provided with a spindle 53 disposed on an air slide 52, and for rotating the exposure mask substrate 31 around the center of axle thereof.

The disposing section is configured to be able to slide the substrate 31 with the air slide 52 in two axial directions perpendicular to each other in a plane perpendicular to the center axle of the substrate 31.

An electron beam column 54 is disposed on the disposing section of the irradiated body of the electron beam, namely the exposure mask substrate 31.

The electron beam column 54 is composed including an electron gun 55, a condenser lens 56, a blanking electrode (beam modulation section) 57, aperture 58, a beam deflection electrode 59, a focusing lens 90, a field lens 91, and so on.

According to this configuration, it is arranged that the electron beam 92 generated from the electron gun 55 is switched on or off by the blanking electrode 57 and the aperture 58.

The field lens 91 makes the electron beam 92 converge to be smaller than 100 nm in diameter, and focus on the resist for the electron beam on the exposure mask substrate 31. The electron beam exposure is performed with a predetermined pattern by the pattern irradiation of the electron beam to the resist layer 33 on the exposure mask substrate 31 rotated by the spindle 53 and moved in the radial direction by the air slide 52.

The resist layer 33 thus processed with the pattern exposure is then developed as described above to be provided with the openings 34 as shown in FIG. 4B, and the light blocking metal film 32 is etched through the openings 34, thus the exposure mask board 35 as shown in FIG. 4C is manufactured.

An embodiment of performing reduced exposure using the exposure mask board thus formed will now be described.

Figure 7:
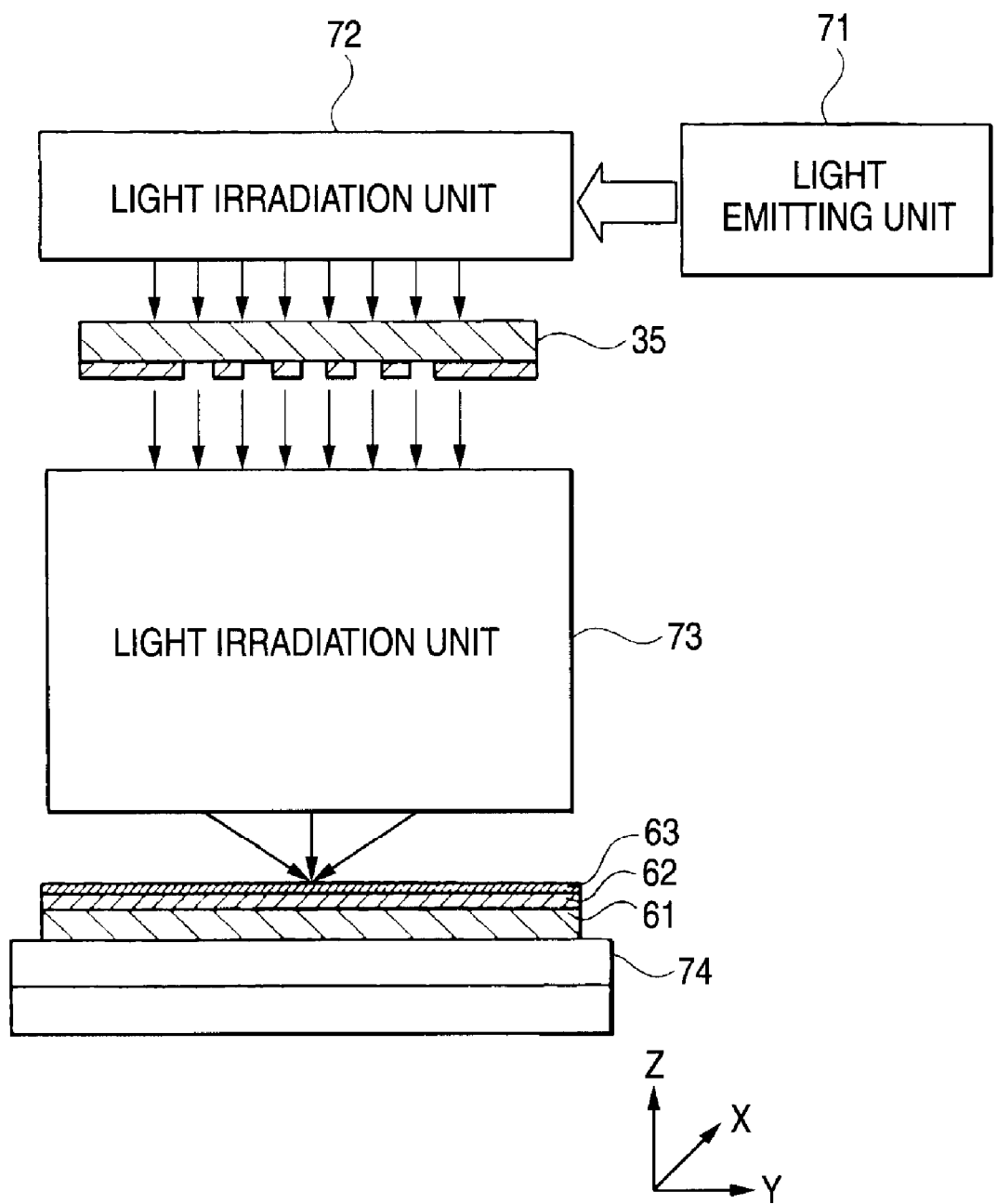
FIG. 7 is a schematic configuration diagram of an example of a reduced exposure device used for a method of manufacturing a magnetic disk according to an embodiment.
Figure 8:
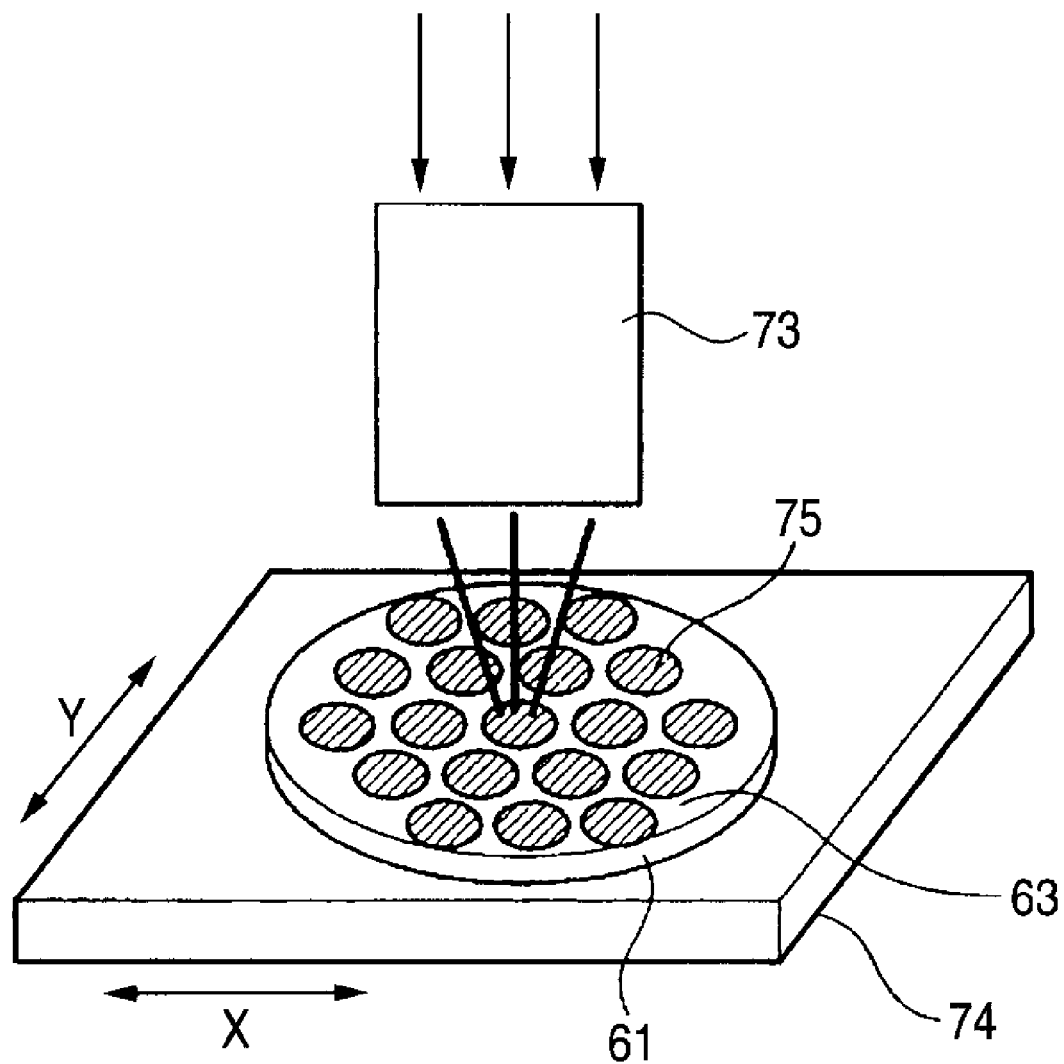
FIG. 8 is an explanatory diagram of an exposure state in the reduced exposure.

FIG. 7 is a schematic configuration diagram of a stepper type reduced projection exposure device for performing the reduced projection exposure. FIG. 8 is an explanatory diagram of an exposure state in the reduced exposure.

In this case, there are provided a light emitting unit 71, a light irradiation unit 72, a reduced projection unit 73 including a disposing section for the exposure mask board 35 and a field lens (not shown) for reducing the exposure pattern of the exposure mask board 35 to, for example, one-quarter, an XYZ drive stage 74 for mounting the substrate 61 composing the magnetic disk and for moving in the optical axis direction Z and directions X and Y perpendicular to each other in a plane perpendicular to the optical axis Z.

The exposure process is performed to the photoresist layer 63 by the reduced projection exposure device with the pattern obtained by reducing the exposure pattern of the exposure mask board 35.

Further in this case, by moving the substrate 61 stepwise in the X and Y directions by the XYZ drive stage 74, it becomes possible to finally perform the step exposure on a plurality of sections each forming the magnetic disk.

In this case, for example, there is provided a large area substrate with 300 mm in diameter, for example, made of glass, Si, Al, or the like provided with surface material layers composed of $SiO_2$ layer or the like formed on the both of front and back surfaces allowing to obtain a plurality of magnetic disks, and the photo resist layers are applied to be formed on the surfaces of the substrate.

The exposure corresponding to a plurality of disks is performed by exposing stepwise the photoresist layer on the substrate 61 described above with the reduced projection exposure using the exposure mask board 35 having the exposure patterns of the separation groove for DTR.

Thus, the photoresist layer 63 of the substrate 61 can be provided with a plurality of exposure processing sections 75 each corresponding to the magnetic disk formed thereon as shown in FIG. 8.

It should be noted that as the light source unit 71 of the reduced projection exposure device, for example, ArF excimer laser with a wavelength of 193 nm can be used, the field lens having the numerical aperture (N.A.) of 0.92 can be used as the field lens for the reduced projection unit 73, and the stepper with an exposure range of 26 mm×33 mm can also be used. In this case, since the resolution of 65 nm or less can be obtained, it becomes possible to easily form the separation groove with the track pitch of 130 nm.

Further, since the exposure range covers a circle of one inch (25.4 mm) in diameter, the pattern exposure of the DTR type of hard disk of one inch in diameter is possible. For example, it is possible to expose about fifty patterns of one inch diameter on one wafer substrate of 300 mm in radius.

A specific example of a manufacturing process for forming the separation groove for DTR forming magnetic disks on the both of front and back surfaces of the substrate by such a exposure method will now be described.

FIGS. 9A through 9H are manufacturing process diagrams showing a series of processing steps such as application of the resist on the both of the front and the back surface of the substrate, the pattern exposure described above, etching of the surface material layer formed of an SiO layer or the like, formation of the magnetic film, and application of the protective layer with a cross-sectional configuration of the substrate.

Figure 9A:
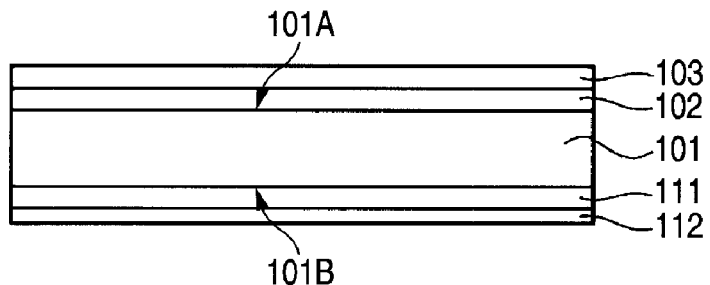
FIGS. 9A through 9H are manufacturing process diagrams of an example of a method of manufacturing a magnetic disk according to an embodiment.
Figure 9B:
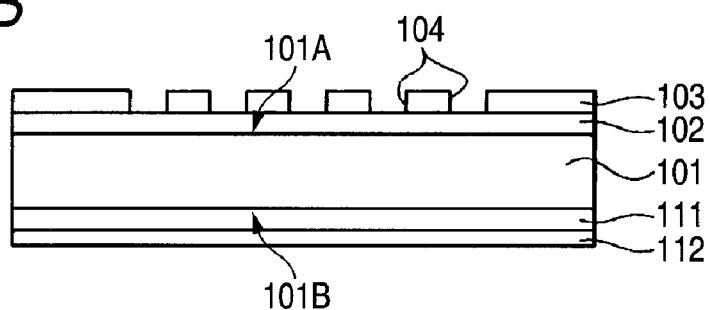

Firstly, as described above, a substrate 101 such as a wafer with a relatively large area is provided, and one of the surface thereof is defined as a first surface 101A, the reverse side surface thereof is defined as a second surface 101B. As shown in FIG. 9A, the first and the second surfaces 101A and 101B are previously provided with the surface material layers 102 and 111 formed of a SiO$_2$ layer formed thereon by thermal oxidation or the like, and the surface material layer 111 on the second surface 101B is covered by a protective layer 112 made of polyimide or the like. Then, the photoresist layer 103 is applied on the surface material layer 102 on the first surface 101A.

Subsequently, the pattern exposure and developing process by the reduced exposure device, for example, is performed, and the openings 104 for the separation grooves for DTR are provided to the photoresist layer 103.

Figure 9C:
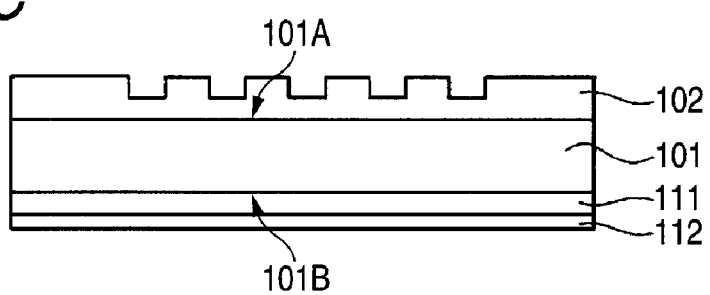

Subsequently, as shown in FIG. 9C, the dry etching is performed on the surface material layer 102 formed of SiO$_2$ layer or the like through the openings 104 to form concave separation grooves with the depth of several tens of nanometers, for example, on the material surface. Subsequently, the photoresist layer is removed, and cleaning of the surface is then performed.

Figure 9D:
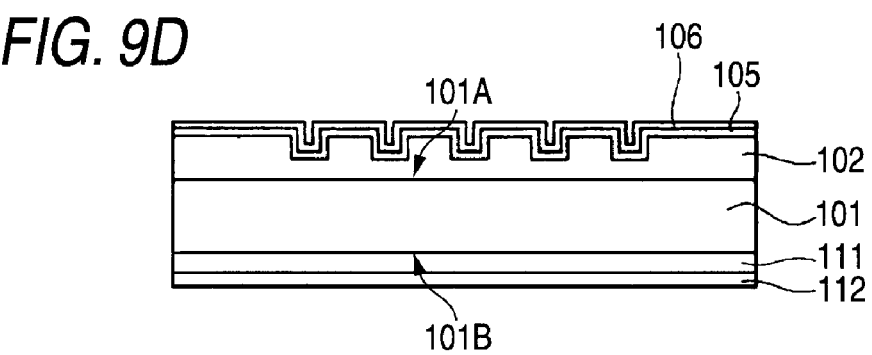
Figure 9E:
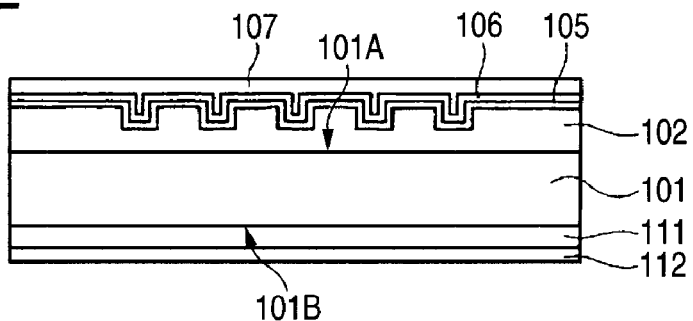

Subsequently, as shown in FIG. 9D, a magnetic layer 105 forming a perpendicular magnetic recording film, for example, is applied by sputtering or the like to the first surface 101A of the substrate 101 provided with the separation grooves. As disclosed in the first document described above, the perpendicular magnetic recording film can also be formed as a laminated structure composed of a soft magnetic layer (SUL: soft under layer) and a CoCrPt magnetic film, for example. Further, a protective layer 106 made of diamond like carbon (DLC) or the like is formed thereon. According to the process so far, a plurality of magnetic disk structures each having separation grooves for DTR is formed on the first surface 101A as one of the surfaces of the substrate 101.

Further, a protective layer 107 made of polyimide or the like for preventing any damages during the manufacturing process for the remaining back side, namely the second surface 101B thereof is applied on the protective layer 106.

Subsequently, the series of steps described above, namely the pattern exposure of the separation grooves, the etching, the formation of the magnetic layer and the protective layer are performed on the back side, namely the second surface 101B of the substrate 101.

Figure 9F:
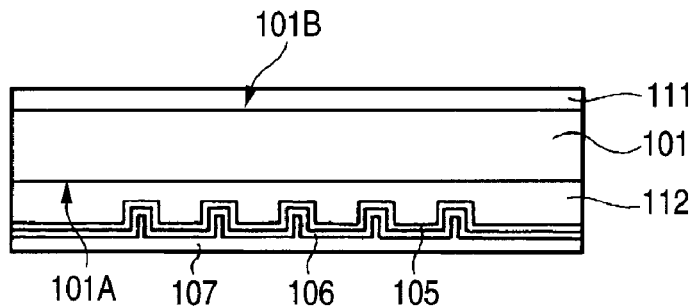
Figure 9G:
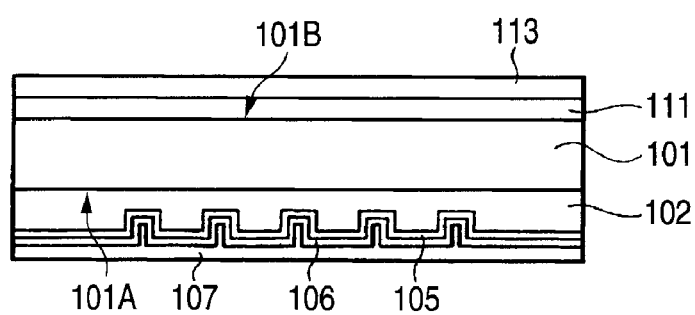
Figure 9H:
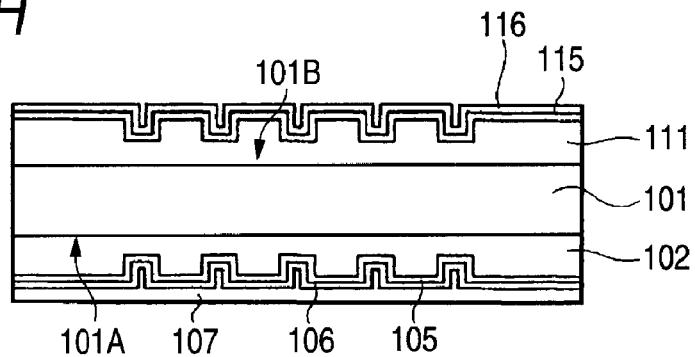
Figure 10:
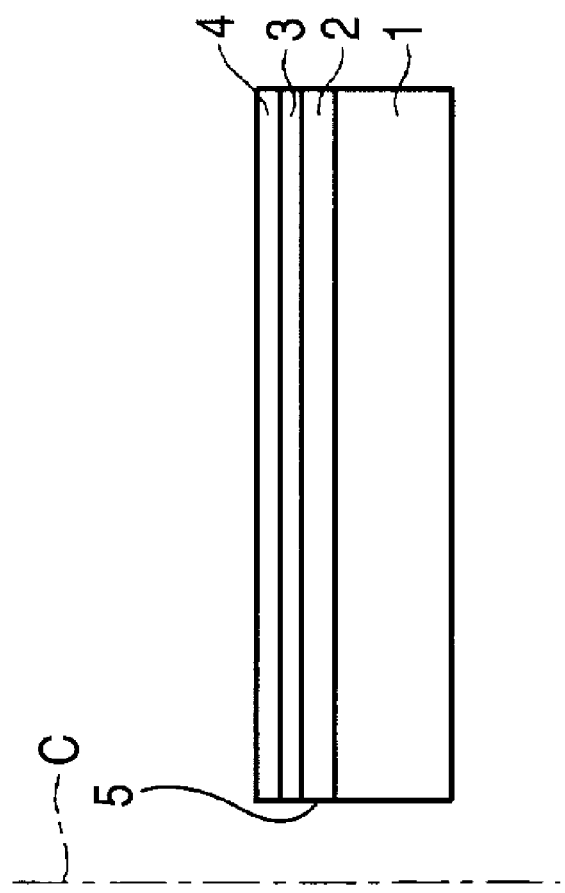
FIG. 10 is a schematic cross-sectional configuration diagram of an example of a typical hard disk medium.

In other words, the protective layer 112 made of polyimide or the like is removed from the second surface 101B as shown in FIG. 9F, and then a photoresist layer 113 is applied thereon as shown in FIG. 9G. Then, the concave separation grooves with the depth of several tens of nanometers are formed by the similar pattern exposure by the reduced exposure or the like, the development, and the dry etching, and further the magnetic layer 115 formed of the laminated structure composed of the soft magnetic layer and the CoCrPt magnetic film and the protective layer 116 made of DLC or the like are formed as shown in FIG. 9H. Thus, a plurality of the magnetic disk structures each having the separation grooves for DTR is formed also on the second surface 101B similar to the first surface 101A.

In this case, since the appropriate protective layer is formed on the reverse surface of the surface on which the process for forming the magnetic disk structure is performed, as shown in FIGS. 9A through 9E, thus making it possible to surely prevent the reverse surface from being damaged during the process.

Further, in the exposure of the separation groove pattern, a precise alignment is performed prior to the exposure so that the separation groove pattern is overlapped with the previously exposed one in the same positions.

As the alignment method, for example, it can be cited to previously provide a mark which can be confirmed from both of the frond and back sides such as a notch provided on an edge of the substrate 101, or a mark for alignment formed in the center section thereof based on such a notch.

Specifically, in the case in which the substrate 101 is made of a transparent material such as glass, the position of an alignment mark previously formed on either side thereof by etching or the like can also be optically detected from the reverse side.

Further, if the substrate 101 is made of an opaque material such as Si or Al, besides the notch described above, the method of performing alignment by detecting the position of a through hole previously formed around the outer periphery by etching or laser processing can be cited.

By adopting such an alignment method, the alignment can precisely be performed in both the front and the back sides.

As described above, a number of magnetic disks are carved out form the substrate on which a number of magnetic disk structures provided with separation grooves for DTR on the both surfaces are formed by cutting into desired disk shapes. In the cutting process a high-power laser for machining, for example, can be used. Further, cutting by etching is also possible. Lastly, after performing a cleaning process and a cutting edge treatment on the surfaces of the magnetic disks thus carved out, a lubricant agent is applied on the both surfaces of the disks to finish the magnetic disks with the DTR structure.

According to an estimation of the storage capacity of the one inch size hard disk medium with the track pitch of 130 nm manufactured by the method of manufacturing a magnetic disk of an embodiment of the present invention, the number of tracks per inch (TPI) becomes 195 K tracks per inch, and the number of bits per inch (BPI) becomes 1.37 M bits per inch assuming that the BPI is seven times as large as the TPI, resulting in the surface recording density of 200 G bits per square inch. This means that the disk with one-inch diameter can offer the storage capacity of about 16 GB by double side taking the effective data area, the efficiency, and so on into consideration.

As described above, according to an embodiment, since the recording layers are formed on both of the front and back surfaces of the substrate in the method of manufacturing the magnetic disk having the DTR structure, the storage capacity can be doubled compared to the past.

Further, by applying the photolithography process using the reduced projection exposure method, a number of small sized magnetic disks, for example, smaller than 1.3 inch in diameter, specifically one-inch sized magnetic disks can be manufactured from the wafer substrate of 200 mm through 300 mm in diameter in large quantities, in particular the small sized hard disks for mobile use can be manufactured in large quantities.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing a magnetic disk, comprising the steps of:
disposing a plurality of magnetic recording tracks concentrically, each of the magnetic recording track including a plurality of sectors, the sector including a data information recording area and a control information recording area; and forming a separation groove between data areas each included in the data information recording area included in each of the plurality of magnetic recording tracks, and in which data is written;

wherein, the step of forming a separation groove includes the steps of forming a resist layer having an opening corresponding to a pattern of the separation groove by photolithography, wherein the pattern of the separation groove is formed corresponding to each of a plurality of magnetic disks disposed on a substrate, and etching to form the separation groove with a predetermined depth on a surface of one of the substrate and a material formed on the substrate through the opening of the resist layer, in the step of forming the separation groove, the step of forming the resist layer and the step of etching are performed for both of a front surface and a back surface of the substrate.

2. The method of manufacturing a magnetic disk according to claim 1, wherein exposure in the photolithography in the step of forming the separation groove is reduced projection exposure using an exposure mask board formed by lithography using pattern exposure with one of an electron beam and a laser beam.

3. The method of manufacturing a magnetic disk according to claim 1, wherein the substrate provided with a magnetic layer is cut out along an outer periphery of a pattern corresponding to each of a number of magnetic disks to manufacture the number of magnetic disks from the substrate as a single substrate.

4. The method of manufacturing a magnetic disk according to claim 1, further comprising the step of providing a mark for alignment of the pattern corresponding to each of a number of magnetic disks between the front surface and the back surface of the substrate.

* * * * *